United States Patent
Finn et al.

[11] 4,148,013
[45] Apr. 3, 1979

[54] ROTATING SHAFT ALIGNMENT MONITOR

[75] Inventors: Albert E. Finn, Marblehead; Haskell Ginns, Belmont, both of Mass.

[73] Assignee: The Indikon Company, Inc., Watertown, Mass.

[21] Appl. No.: 642,599

[22] Filed: Dec. 19, 1975

[51] Int. Cl.² ............... G08C 25/00; G08C 19/04; G08C 19/08
[52] U.S. Cl. ............... 340/189 M; 33/181 R; 340/177 R; 340/177 VA; 340/199
[58] Field of Search .......... 340/188 M, 195, 199, 340/271, 177 R, 177 VA, 191, 672; 33/DIG. 13, 84, 180 AT, 181 R, 181 AT, 182, DIG. 5; 73/88.5; 116/124 A

[56] References Cited
U.S. PATENT DOCUMENTS

| | | | |
|---|---|---|---|
| 3,711,955 | 1/1973 | Holt | 33/181 R |
| 3,783,522 | 1/1974 | Dodd | 33/181 R |
| 4,033,042 | 7/1977 | Bently | 33/181 R |

Primary Examiner—John W. Caldwell, Sr.
Assistant Examiner—James J. Groody
Attorney, Agent, or Firm—Weingarten, Maxham & Schurgin

[57] ABSTRACT

A system for monitoring misalignment between two in-line rotating shafts and for indicating the direction of shaft misalignment wherein alignment sensors are mounted directly to and rotate with the shafts. The sensors are mounted to detect position or stress variations between elements on coupled shafts as a function of the rotational position of the shaft and thus errors normally encountered where the sensor is positioned off the shaft are avoided. A coupling system such as a rotary transformer is employed to apply power to the sensors and associated circuitry on the shaft and to receive from the shaft signals indicative of sensed misalignment. A signal representative of relative phasing between the rotating shaft and surrounding equipment is provided and is used in electronically processing the misalignment signals to provide output signals indicative of the direction and orientation of misalignment between the rotating shafts on orthogonal axes. Complete data is thus provided on the necessary movement of either or both shafts in order to bring them back into alignment.

10 Claims, 9 Drawing Figures

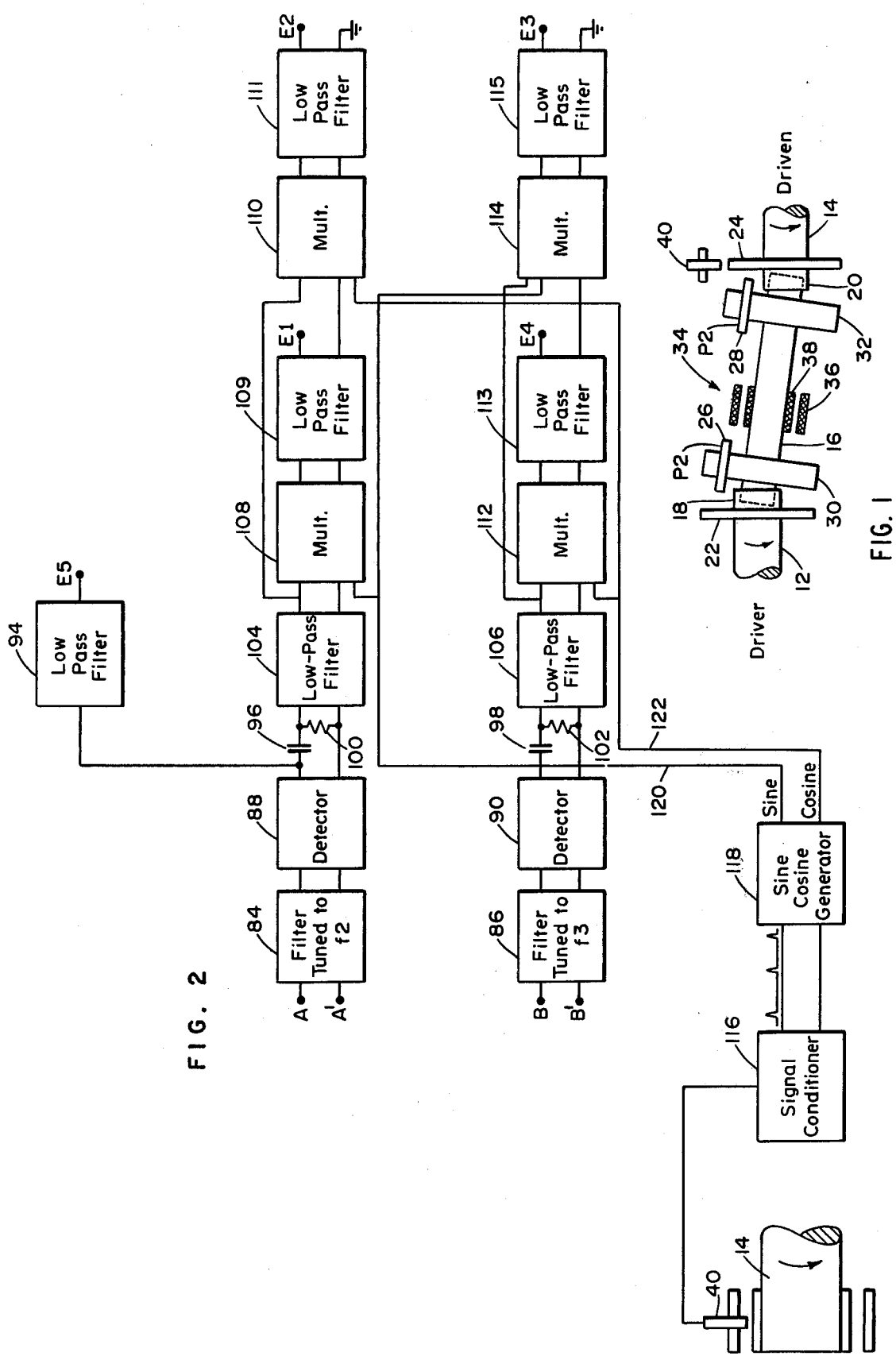

ROTATING SHAFT ALIGNMENT MONITOR

FIELD OF THE INVENTION

This invention relates to the monitoring of misalignment between in-line rotating elements and, in particular, to monitoring misalignment during rotation.

BACKGROUND OF THE INVENTION

In many motive power systems there is a driving element, typically the source of power such as an internal combustion engine or electrodynamic machine, which is coupled to a driven element which accomplishes some function in response to the power coupled to it from the driving element. The coupling typically comprises a spacer shaft and two hubs which flexibly connect the spacer shaft to the shaft of the driving and driven elements respectively. In relatively high power applications involving several hundreds or thousands of horse power, it is typical to employ for the coupling hubs spline gears, flexible diaphragms, or other similar elements. Because of the power which is transmitted down the shaft and the nature of the hubs and bearings in the driven and the driving elements, very little misalignment can be tolerated without causing rapid deterioration of the hubs or bearings and inducing their early failure. It is accordingly customary to attempt to attain alignment in such systems to a fraction of a degree or better. While such alignment can be achieved in a static or uncoupled condition, when the driven and the driving elements are at rest, such an alignment technique is susceptible to machining errors and the changes in temperature, pressure, loads and bearings that occur when the equipment is operating, with the shafts rotating and with the entire system at thermal equilibrium. Accordingly, the measure of alignment should be accomplished under operating conditions.

Some systems which have been employed to measure alignment of shafts under operating conditions have conventionally employed some form of sensor stationed off the rotating shafts or couplings to detect cyclic variations at the rate of rotation caused by misalignment. Others measure the misalignment of static elements attached to the housings of the driving and driven elements relying on the assumption that their misalignment accurately reflects shaft misalignment. These generally indirect techniques for sensing alignment require extreme precision and calibration in the use and fabrication of critical parts, such as the element whose cyclic motion is being detected, or the points of alignment measurement of the static elements.

BRIEF SUMMARY OF THE INVENTION

In accordance with the teaching of the present invention a system is described for detecting shaft misalignment in the coupling between a driven element and a driving element wherein the alignment sensors are located to rotate with the shaft and coupling such that the AC component appearing in the sensor output at the frequency of rotation is attributable only to misalignment. Power for energizing the sensors is coupled to the shaft and the sensor signals are coupled from the shaft to processing electronics which, in conjunction with a signal indicating shaft phasing, provides an output indication of misalignment between the driving and driven elements at the coupling along orthogonal axes.

In particular, the shafts of driving and driven elements are usually coupled by an intermediate power transfer shaft or spacer having at each end a flexible coupling or hub between the spacer shaft and the shaft of the driving or driven element. A coupling comprising a single hub is also contemplated. Electrical power is typically coupled to the spacer shaft through a rotary transformer where it is employed to energize sensors mounted on the intermediate shaft for rotation therewith. Each sensor, which may be a proximity director or differential transformer, to name only two examples, detect the cyclic once per revolution motion between misaligned shafts allowed by the flexible hubs. Alternatively, where little misalignment is expected, the shafts can be rigidly coupled and instrumented with strain sensors to detect shaft bending directly representative of misalignment.

In all cases, since the sensors rotate with the shaft, there is no error introduced by nonprecise machining as in the case where the sensing and sensed structure are relatively rotating. Accordingly, each sensor provides an AC signal output directly representative of the misalignment between adjacent shafts however joined. In addition, since the sensors are located on the shaft, they detect directly the flexure or bending of the shafts and are thus more highly sensitive to misalignment parameters.

The signals from the shaft mounted sensors are then coupled from the shaft as through a rotary transformer, to processing electronics. A marker probe detects a predetermined point in the rotation of the shaft which is used to process the two sensor signals, resolving the misalignment information into misalignment at each hub along orthogonal axes. This output provides complete data on shaft misalignment at running speed and temperature equilibrium conditions which permit adjustment of the driving and driven elements, either while running or stationary, by an amount specified in this output to correct or greatly reduce the misalignment under actual running conditions.

BRIEF DESCRIPTION OF THE DRAWINGS

These and other features of the present invention will be more fully understood from the following, solely exemplary and not limiting, detailed description of the preferred embodiments and accompany drawing of which:

FIG. 1 is a pictorial view of a shaft and coupling for the output shafts of a driven and driving element;

FIG. 2 is a circuit diagram of electronics for energizing shaft mounted sensors showing in FIG. 1 and for processing the signals of the shaft mounted sensors;

DETAILED DESCRIPTION OF THE PREFERRED EMBODIMENT

Figure 3:
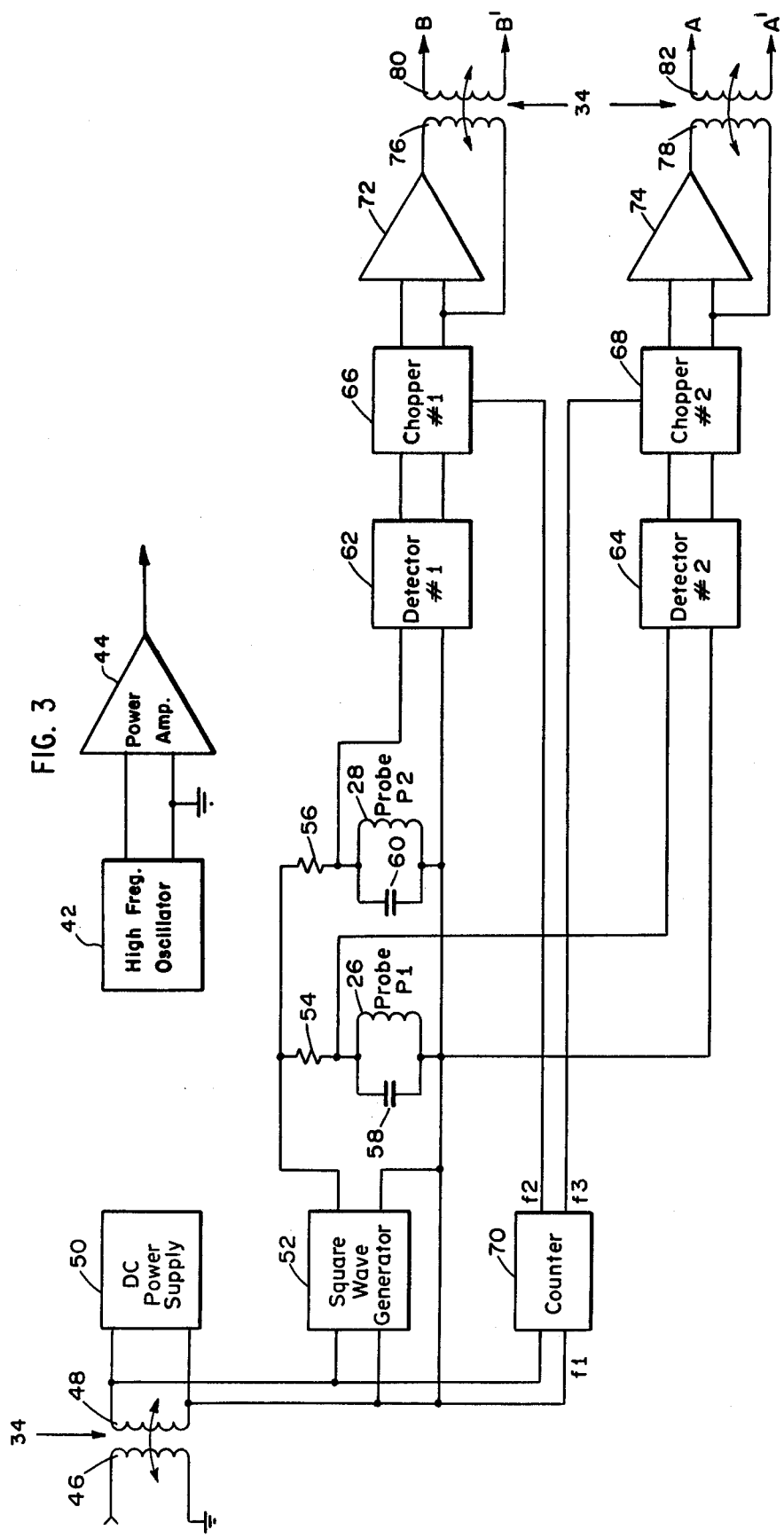
FIG. 3 is a circuit diagram of electronics mounted on the shaft.

The present invention contemplates a system for measuring misalignment in the coupling of the shafts of a driven element and a driving element during normal operation, with the shafts in motion, by the use of sensors applied to and rotating with the shafts and couplings to eliminate errors induced by monitoring running alignment from external locations or under stationary conditions. The invention may best be understood by reference to the drawings and in particular to FIG. 1 showing a shaft 12 of a driving element coupled to a shaft 14 of a driven element through a coupling having an intermediate shaft or spacer 16 with a hub 18 flexibly coupling the driving shaft 12 and spacer 16 and a hub 20 flexibly coupling the driven shaft 14 and spacer 16. The hubs 18 and 20 may be of spline gear design, as shown, or other forms such as flexible diaphragm coupling.

The shafts 12 and 14 from the driver and driven elements include terminal flanges 22 and 24 respectively. Proximity probes 26 and 28 are attached through terminal flanges 30 and 32 respectively of the spacer 16 to confront the flanges 22 and 24 on the driving and driven shafts 12 and 14 so as to detect the variation in the gap between the two sets of flanges 22 and 30 on the one hand, and 24 and 32 on the other. The sensed variation in gap with rotation permits detection of the misalignment (exaggerated for purposes of illustration) shown in FIG. 1.

As can be seen from the representation in FIG. 1, as the shafts 12, 16 and 14 rotate together, the flanges 22 and 30, as well as the flanges 24 and 32 at the point where the probes 26 and 28 are located will rock back and forth periodically approaching and receding from each other at the rate of rotation. The phasing and magnitude of these variations reflects the extent of misalignment between the shafts 12 and 14, the direction of misalignment, as well as the nature of misalignment, i.e. purely angular offset, purely parallel offset, or a combination.

In order to energize the probes 26 and 28 to provide an electrical output reflecting this variation, a rotary transformer 34 has static mounted primary windings 36 surrounding shaft mounted secondary windings 38 to couple energy to the shaft as well as to couple the probe signals from the shaft to external processing electronics.

In addition, a marker probe 40 is provided, mounted external of the rotating shafts, to detect a marked portion of a rotating surface of one of the shafts, such as flange 24 on shaft 14. The probe 40 may be of any convenient type and the mark may be optical or physical as desired. The signal from the probe 40 provides a reference marking in the rotation of the shafts which permits the resolution of the signals from the probes 26 and 28 into orthogonal misalignment magnitudes.

It can be seen from the illustration of FIG. 1 that the operation of the probes 26 and 28 is immune to surface irregularities in the surfaces, such as flanges 22 and 24 being gauged, since the probes will face the same identical point of the surfaces at all points of rotation. In addition, the result on sensor signals of any axial position shifts of the intermediate shaft 16 can be cancelled in the final output, particularly where the probes or sensors 26 and 28 are linear. The extent of this motion, can however, be detected as desired.

It can be seen that the degree of movement detected by the probes 26 and 28 directly reflects misalignment and increases with the distance of the probe from the points of flexure in hubs 18 and 20 thereby permitting control over probe sensitivity.

The probes 26 and 28 may be of any form capable of detecting proximity and in particular they may be eddy current or capacitive probes, both of which are well known in the art.

While the coupling shown in FIG. 1 has two hubs 18 and 20 and a spacer 16, the present invention may also be utilized with a single hub and single probe where conditions permit. The electronics described below for two probes would then only use a single channel.

With reference to FIG. 3, there is shown electronic circuitry located off the shaft for transmitting sensor energy to the shaft and for processing sensor response signals coupled from the shaft. In particular, high frequency oscillator 42 operating at an exemplary frequency of 200 Khz provides an output signal to a power amplifier 44, the signal output of which is applied, in FIG. 3, to a primary coil 46 of the rotary transformer 34 for coupling to a secondary coil 48 on shaft 16. This signal is in turn applied to a DC power supply 50 which energizes the various components mounted on the shaft. A squarewave generator 52 also responds to the signal from the secondary coil 48 and acts as an amplitude limiter to provide a constant amplitude output signal to energize the probes 26 and 28 respectively. Resistors 54 and 56 are connected in the energizing current path to act as constant sources for the probes. Capacitors 58 and 60 are connected across the probes 26 and 28 respectively to tune them to a point just off resonance for preferred operation.

The signals across the probes 26 and 28 are applied for rectification to respective detectors 62 and 64 and the rectified outputs of these detectors are applied to respective modulators 66 and 68 where they are chopped or modulated at different frequencies, F2 and F3, as provided by a counter 70. Counter 70 produces frequency division of the 200 Khz signal from the secondary coil 48. Typically, these two frequencies might be 25 and 12.5 Khz respectively. The chopped signals are applied to respective amplifiers 72 and 74 for amplification before application to shaft mounted primary coils 76 and 78 of the rotary transformer 34 where they are coupled to secondary coils 80 and 82 respectively. As can be now seen the coils 48, 76 and 78 form the windings 38 of the rotary transformer 34, while the coils 46, 80 and 82 form the windings 36 of the rotary transformer 34.

Returning to FIG. 2, the signals from coils 80 and 82 are applied to respective filters 84 and 86 tuned to the different chopping frequencies, F2 and F3, to eliminate any signals resulting from cross-talk between the coils of the rotary transformer. This feature makes the use of two frequencies for the probe signals beneficial. The outputs of the filters 84 and 86 are applied to detectors 88 and 90 respectively which restore the signals to the condition at the output of the detectors 62 and 64, essentially an AC signal varying at the frequency of rotation of the shafts and with magnitudes reflecting total misalignment at hubs 18 and 20.

The output of the detector 88 may be applied through a low-pass filter 94 to provide at an output E5 a DC average indicating the magnitude of axial misalignment in general.

In addition, the output of the detectors 88 and 90 are AC coupled through respective series capacitors 96 and 98 and shunt resistors 100 and 102 to low-pass filters 104 and 106 which remove remaining components of the chopping frequency. The output of low-pass filter 104 is applied to multipliers 108 and 110, and subsequent low-pass filters 109 and 111, while the output of low-pass filter 106 is applied to multipliers 112 and 114 and subsequent low-pass filters 113 and 115. The multipliers 108, 110, 112 and 114 also receive signals representative of the phase of rotation of the shafts 12, 14 and 16 as provided from the marker probe 40 through a signal conditioner 116 and sine-cosine generator 118. The signal conditioner 118 provides a series of shaped output pulses at each passage of the mark on rotating shaft 14 to generator 118. Sine and cosine signals (quadrature phased sinewaves) on respective lines 120 and 122 from generator 118 are applied respectively to multipliers 108 and 114 for the sine function and multipliers 110 and 112 for the cosine function. These signals provide phase sensitive demodulation within the active filters according to known techniques to provide DC outputs E1, E2, E3 and E4 representing orthogonal misalignment at each hub. In particular: E1 = X axis variation in sensed gap at probe 26 (horizontal); E2 = Y axis variation in sensed gap at probe 26 (vertical); E3 = X axis variation in sensed gap at probe 28 (horizontal); and E4 = Y axis variation in sensed gap at probe 28 (vertical). Spurious or randum signals such as might be generated by gear noise in the coupling system between shafts are also eliminated by such filtering.

Using the magnitudes of these output signals, E1-E4, it is possible to derive various other parameters of misalignment. The angle of misalignment at each hub in the applicable directions is proportional to the corresponding output signal magnitude divided by the displacement of the corresponding sensing probe from the axis of flexure of the shafts. Similarly, the total angle of misalignment between the input and output shafts in the X axis is the sum of the E1 and E3 output signals divided by this displacement and in the Y axis the sum of the E2 and E4 signals divided by this displacement. Also, the offset distances in the X and Y directions can be similarly calculated (for small angles) as the angle of misalignment times the length of shaft. Thus the offset in the X (Y) axis of hub 20 from hub 18 is the X (Y) axis angle of shaft 16 to shaft 12 times shaft 12 length. For total offset at the driven element the shaft angle at hub 18 times the distance to that element from the hub plus the angle of shaft 16 and 14 at hub 20 times the distance to the element from that hub may be calculated for each axis. A circuit 117 may be used to provide these outputs reflecting the adjustment needed to produce alignment under running conditions.

It should be noted that the specific circuitry identified above provides a number of desired features for eliminating noise and preventing signal interference in processing the output signals of the respective probes, these being preferable but not necessary to achieve the functioning of the present invention.

Figure 4:
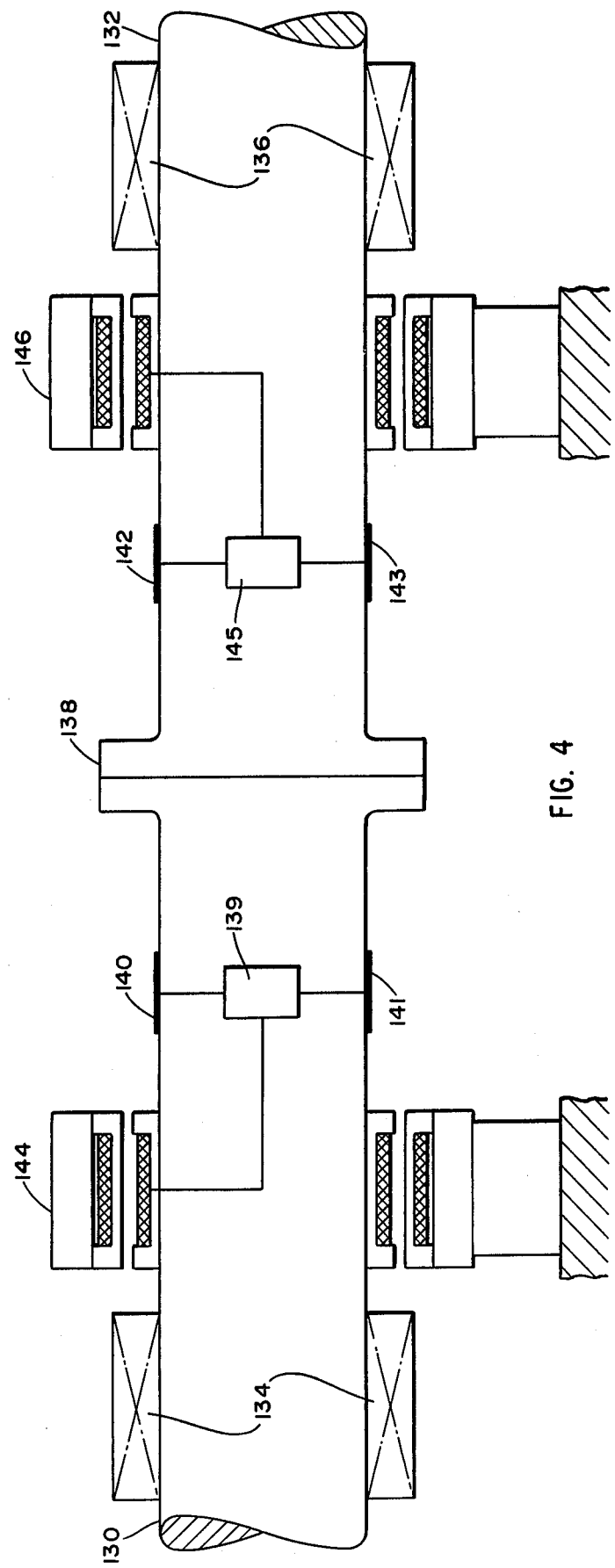
FIG. 4 is a diagram of an alternative coupling scheme and alignment sensor arrangement according to the present invention.

With reference now to FIG. 4, there is shown a further system for detecting misalignment wherein a driving shaft 130 and a driven or intermediate shaft 132 are journaled in respective bearings 134 and 136 and combined through a rigid coupling 138. Either side of the coupling 138, strain gauge sensors 140 and 141, and 142 and 143 are located on opposite sides of shafts 130 and 132 respectively to sense the bending or flexure of the shafts 130 and 132 occasioned by misalignment. The strain gauge sensors 140, 141, 142 and 143 are energized through respective rotary transformers 144 and 146 and circuits 139 and 145. Corresponding output signals from the sensors are retransmitted by the rotary transformers 144 and 146 through circuitry 139 and 145 for signal processing substantially as indicated above in FIG. 2 to provide quadrature bending signals at each of the locations of the strain gauges 140, 141, 142 and 143 which may be further analyzed for exact misalignment data or not as desired. Since the intent of a coupling shaft alignment system is to eliminate misalignment, it is in many cases sufficient to have relative magnitudes and directions of misalignment at locations such as provided by the strain gauge sensors 140 and 142 or probes 26 and 28, without exact calibration in terms of misalignment angles.

Figure 5:
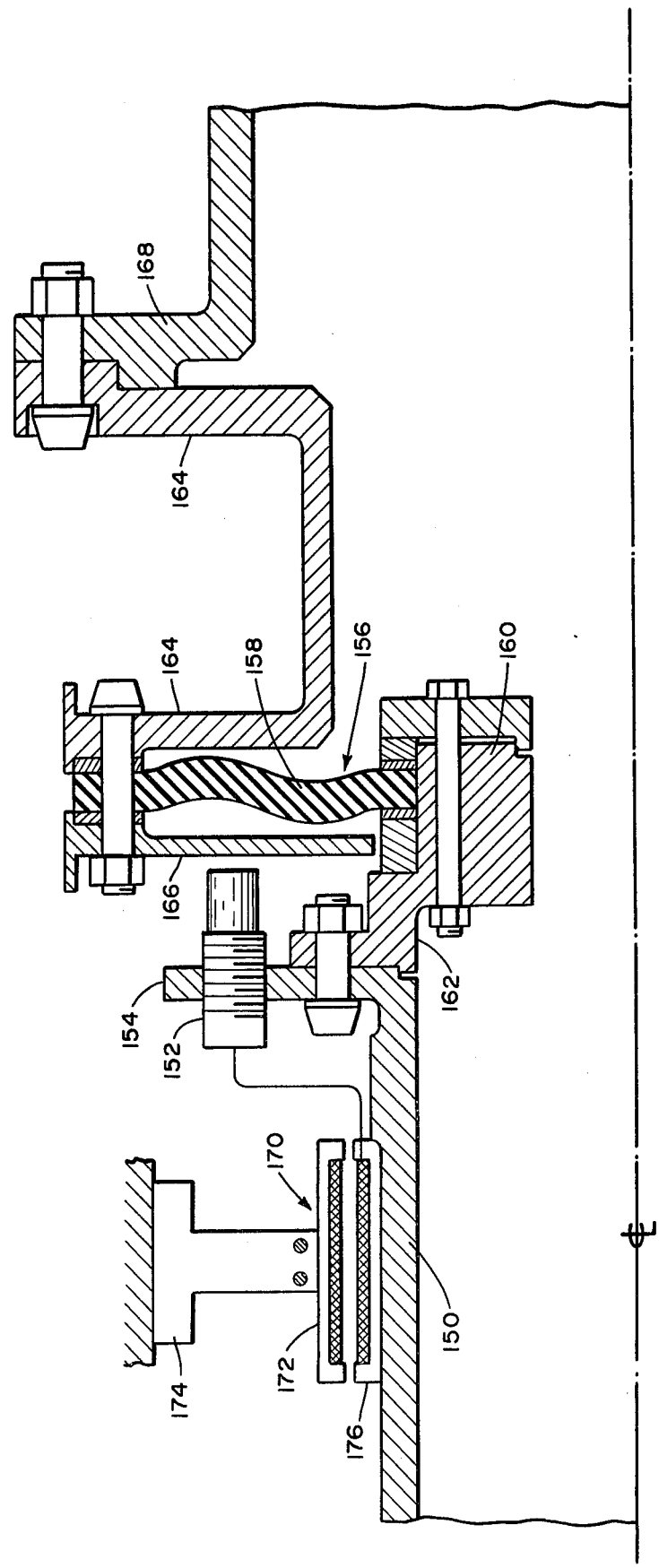
FIG. 5 is a diagram of a further alternative coupling scheme.

With respect now to FIG. 5, there is shown a further embodiment of the present invention for instrumenting a shaft coupling hub wherein the coupling hub comprises a flexible diaphragm. FIG. 5 presents a sectional view of a top portion of a shaft wherein a single coupling of a one or two hub system for joining driven and driving shafts is shown. The first shaft 150, the upper sectional half only of which is shown, has a proximity sensor 152 mounted outwardly upon a flange 154. A diaphragm assembly 156 having a flexible diaphragm 158, inwardly secured by a pressure grip 160 is bolted through a flange 162 to the flange 154. The outer rim of the disc-shaped flexible diaphragm 158 is bolted between a flange 164 and flange 166 which extends inward to provide the surface gauged by the proximity sensor 152. The sensor 152 is energized through a rotary transformer 170 having a primary coil 172 fixed to external support 174 and a secondary coil 176 rotating with the first shaft 150. The flange 164 is further bolted to a shaft 168.

Figure 6:
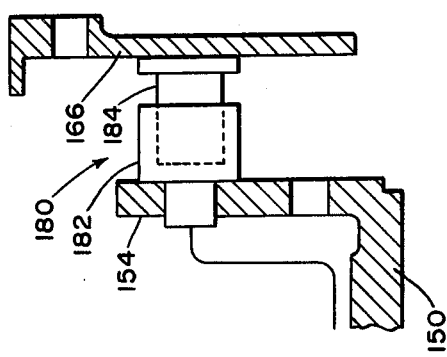
FIG. 6 is a view of a further alternative coupling and sensor scheme.

With respect now to FIG. 6, there is shown a further embodiment for the sensor wherein a differential transformer 180 is shown with coils 182 attached to the flange 154 and a core 184, slidably mounted within the portion 182 affixed to the flange 166. This form of displacement sensor provides a linear signal/gap relation not as inherently available in inductive proximity sensors of comparable dimensions. Linearization by known techniques can be added to the proximity sensor where desired, however.

Figure 7:
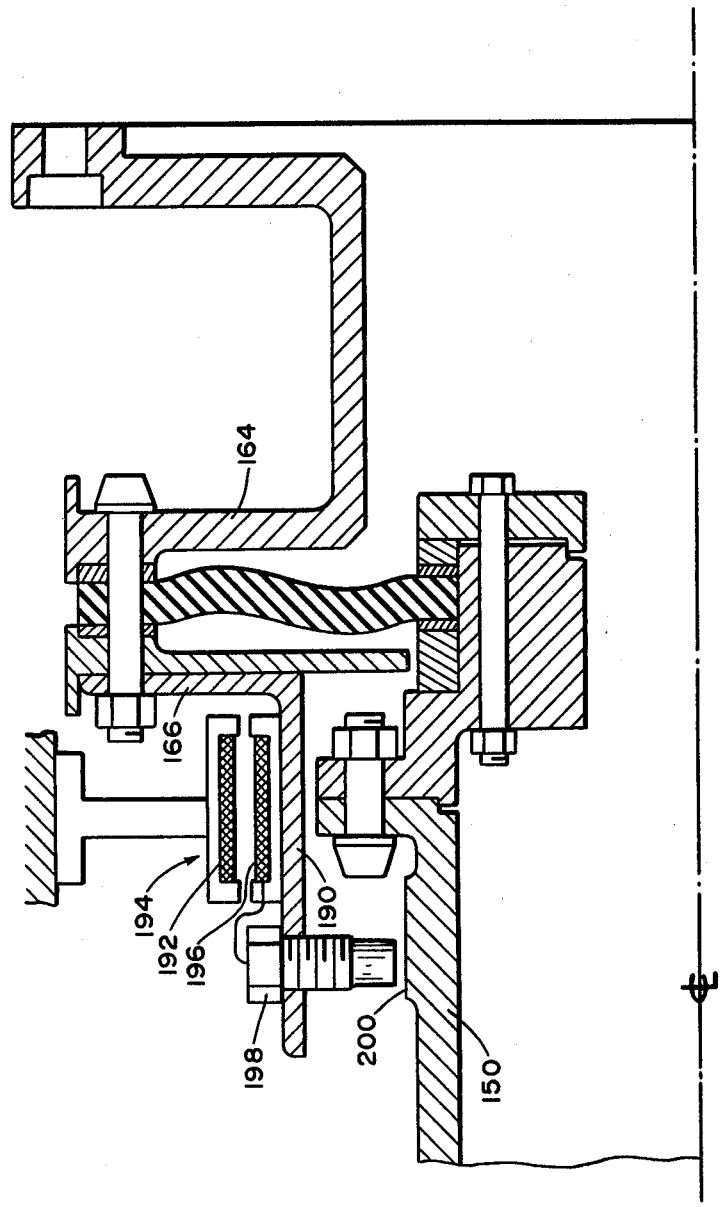
FIG. 7 is a further alternative view of a coupling and sensor system for use in the present invention.

In a further embodiment shown in FIG. 7, there is pictured a flanged collar 190 mounted to extend axially from the flange 166 and having thereon a primary coil 192 of a rotary transformer 194, a secondary coil 196 of which is fixed to external equipment. The collar 190 also carries a proximity sensor 198 which is positioned facing radially toward the shaft 150 to detect the variation in gap getween the sensor 198 and a portion 200 of the shaft 150. This embodiment provides the advantage of far less sensitivity in gap distance to axial motion of the coupling and shafts.

Figure 8:
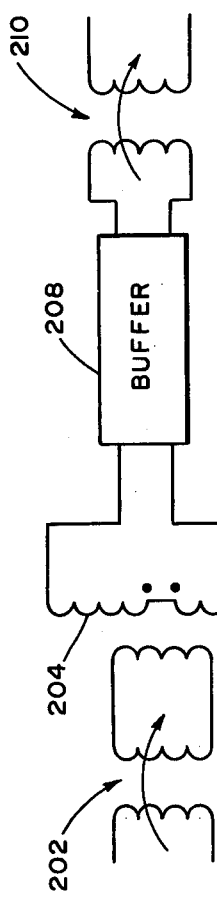
FIG. 8 is a diagram of excitation circuitry for the FIG. 6 alternative.

There is shown in FIG. 8 circuitry for energizing the differential transformer 180 of FIG. 6 including a rotary transformer 202, the secondary of which energizes the primary of the differential transformer 180. Dual secondaries 204 and 206 of the differential transformer 180 are connected in series opposition to an emitter follower 208 (or buffer amplifier) which in turn drives the primary of a rotary transformer 210 for coupling the signal from the differential transformer to external circuitry shown above, in FIG. 2, specifically filter 84. Amplifier 44 shown there may be used to energize the primary of transformer 202. Where two hubs and a spacer shaft are employed, a duplicate of the FIG. 8 circuitry may be utilized for the second differential transformer, preferably driven at a different frequency.

Figure 9:
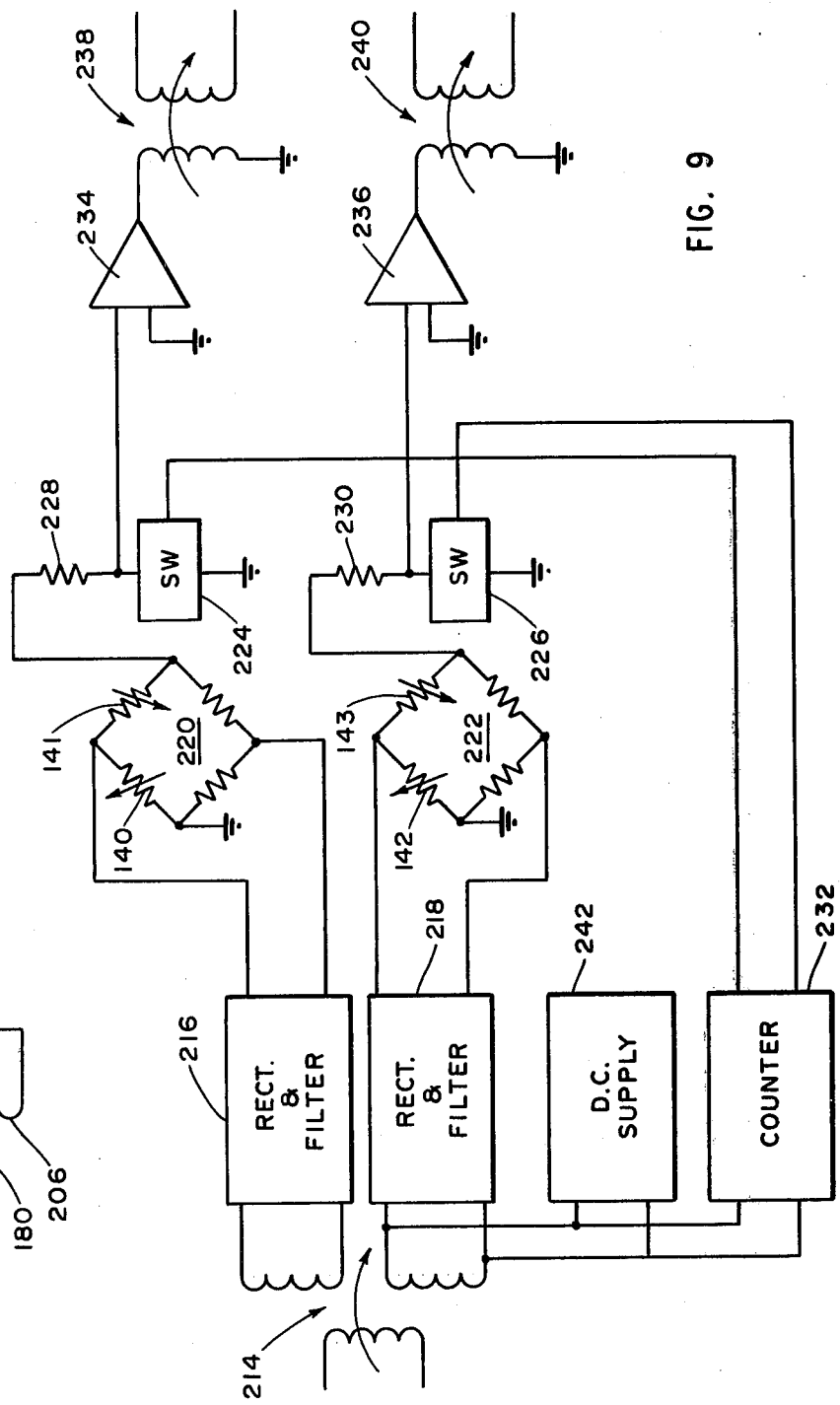
FIG. 9 is a diagram of excitation circuitry for the alternative of FIG. 4.

With reference to FIG. 9 there is shown circuitry for energizing the strain gauges 140, 141, 142 and 143 of FIG. 4 as the circuitry 139 and 145. A rotary transformer 214 fed by amplifier 44 has dual secondaries the outputs of which are rectified and filtered by power suppliers 216 and 218 to provide DC energization for opposite terminals of strain gauge bridges 220 and 222. Strain gauge resistors 140 and 141, and 142 and 143 form the top elements of bridges 220 and 222. The other opposite terminals of the bridges 220 and 222 are repetitively shunted through switches 224 and 226 in series with resistors 228 and 230 respectively. The switches 224 and 226 are controlled by different outputs, typically at 25 Khz and 12.5 Khz respectively, of a counter 232 which frequency divides the 200 Khz signal from one secondary of rotary transformer 214. The chopped signals across switches 224 and 226 are buffered in amplifiers 234 and 236 and coupled off the shaft to the FIG. 2 electronics through rotary transformers 238 and 240. A DC supply circuit 242 is provided for counter 232 and amplifiers 234 and 236.

In embodiments shown above using a single proximity probe or differential transformer on each hub, a second such probe can be added on the opposite side of the hub. The signals from these probes may then be differenced to provide an output compensated for axial motion at the hub.

The above-described preferred embodiments for the present invention are not intended to be limiting in that alterations, modifications and improvements to what is described above are intended to fall within the spirit and scope of the present invention as defined in the following claims.

What is claimed is:

1. A system for detecting the misalignment between two or more co-rotating, in-line shafts comprising:
   first and second co-rotating, in-line shafts;
   sensor means rotating with said shafts and positioned to sense a parameter varying with rotation angle of said shafts and representative of the degree of misalignment of the axes of said first and second shafts;
   means associated with at least one of said first and second co-rotating shafts and rotating therewith for coupling energization to said sensor, whereby said sensor means provides a signal representative of said degree of misalignment;
   means for coupling the signal of said sensor means representative of the degree of misalignment of said first and second shafts therefrom; and
   means responsive to the coupled signal representative of the degree of misalignment for providing an output representation thereof.

2. The system of claim 1 wherein said sensor comprises:
   a proximity probe; and
   means associated with one of said first and second rotating shafts for positioning said proximity probe to detect proximity to a co-rotating portion of the other of said first and second rotating shafts.

3. The system of claim 1 wherein said sensor includes at least one strain gauge attached to one of said first and second rotating shafts to sense flection thereof in response to misalignment between said first and second rotating shafts.

4. The system of claim 1 wherein said sensor includes a differential transformer.

5. The system of claim 1 further including:
   a third shaft co-rotating with said first and second shafts;
   said second shaft being positioned between said first and third co-rotating shafts; and
   said sensor means includes first and second sensors for respective sensing of alignment between said first and second shafts and alignment between said second and third shafts.

6. The system of claim 1 further comprising:
   means for providing a signal representative of the rotational position of said first and second shafts; and
   means responsive to said indication of rotational position for providing in said output representation an indication of misalignment along orthogonal axes of the degree of misalignment between said first and second shafts.

7. The system of claim 5 further including:
   means responsive to sensed alignment between said first and second shafts and alignment between said second and third shafts for identifying predetermined parameters of misalignment.

8. The system of claim 7 wherein said parameters of misalignment include the angle of misalignment between said second shaft and at least one of said first and third shafts.

9. The system of claim 7 wherein said parameters of misalignment include the total angle of misalignment between said first and third shafts.

10. The system of claim 7 wherein said parameters of misalignment include distance of offset between said first and third shafts.

* * * * *